Sept. 5, 1967  R. BAJULAZ  3,339,709
VERTICAL TRANSPORTER

Filed July 13, 1965  7 Sheets-Sheet 1

INVENTOR
ROGER BAJULAZ
By Young & Thompson
ATTYS.

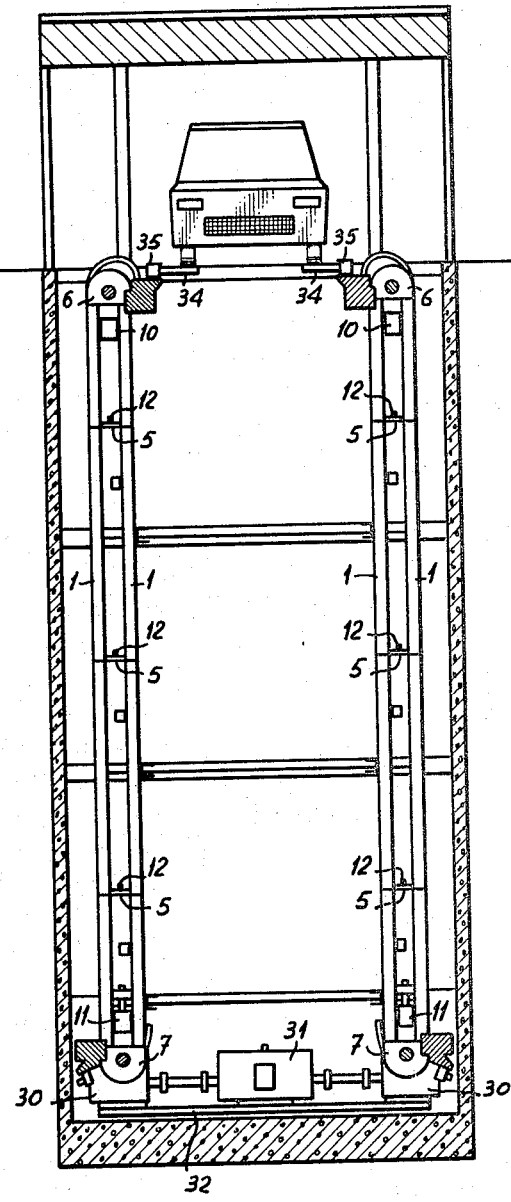

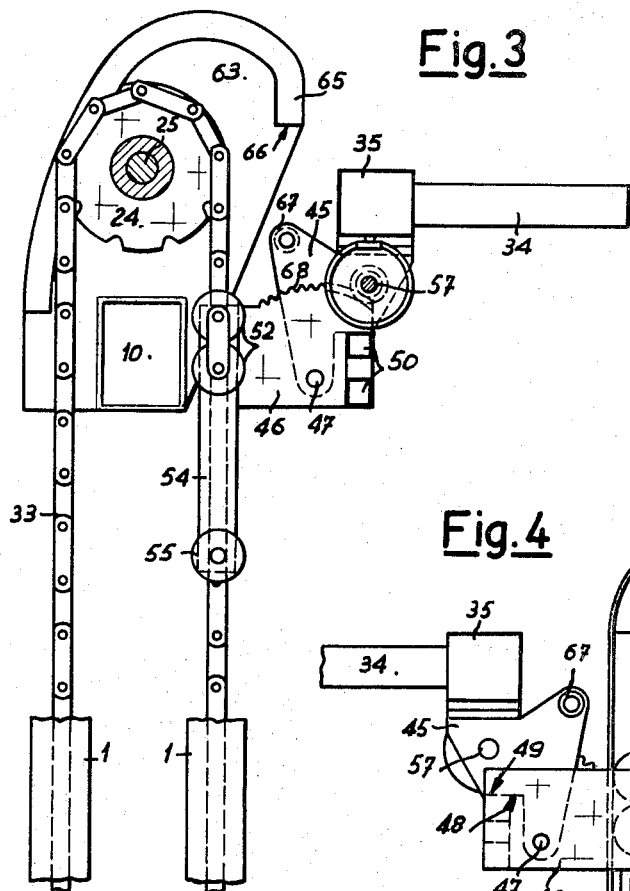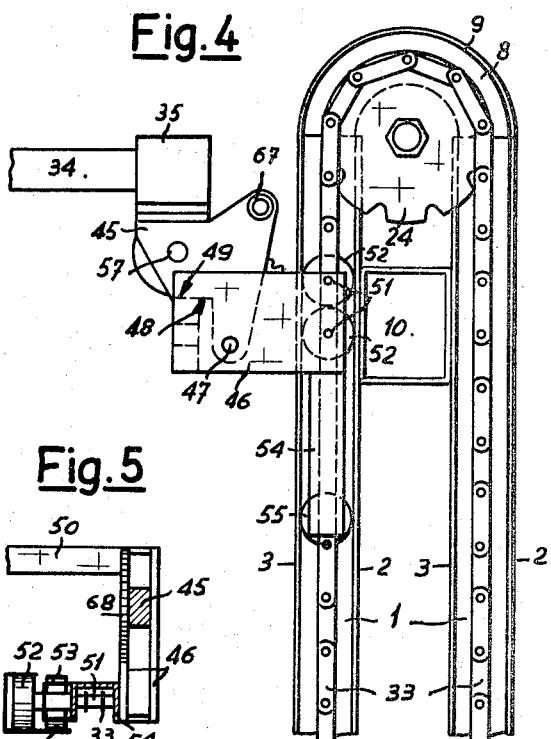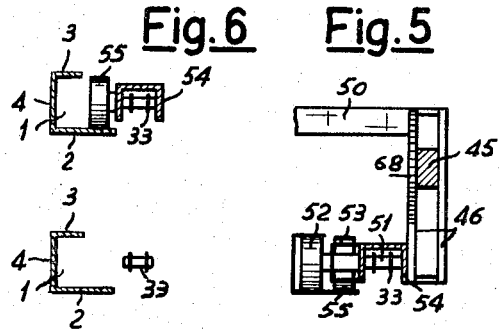

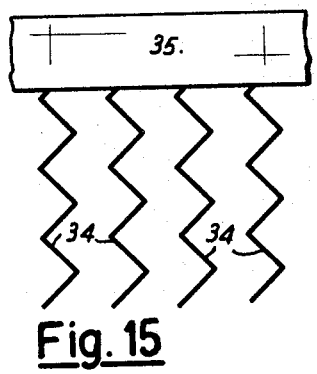
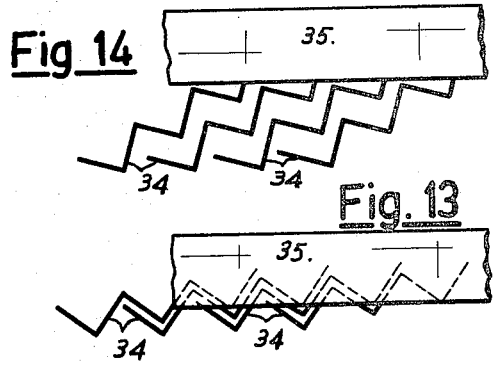
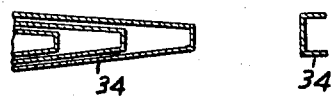
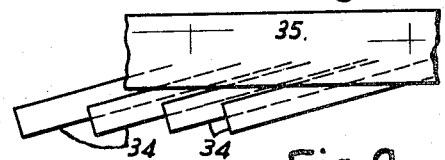
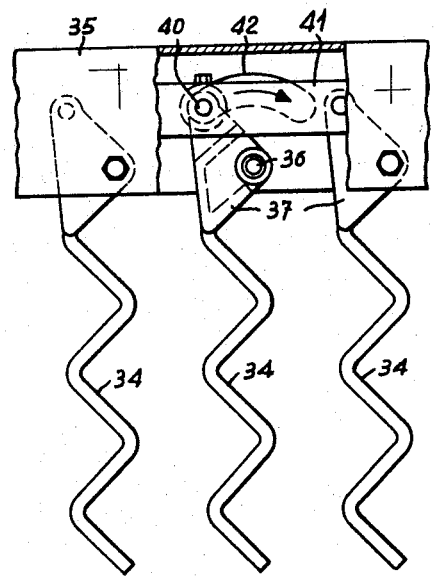
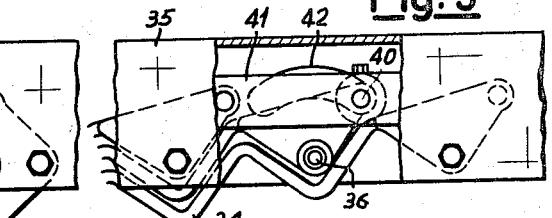
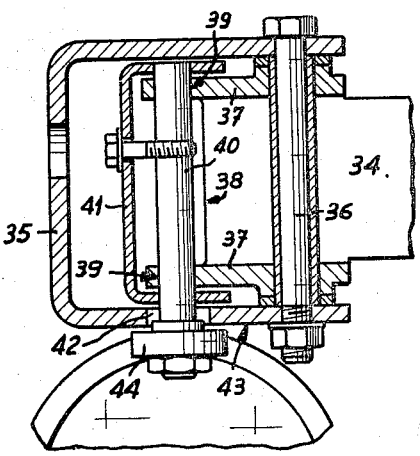

Sept. 5, 1967    R. BAJULAZ    3,339,709
VERTICAL TRANSPORTER
Filed July 13, 1965    7 Sheets-Sheet 7
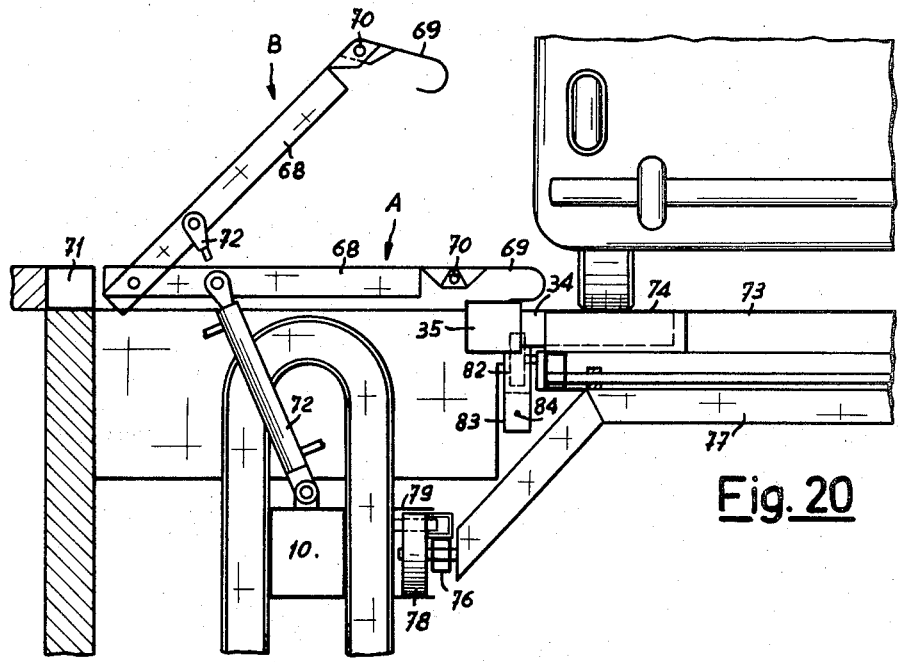
Fig. 20
Fig. 19
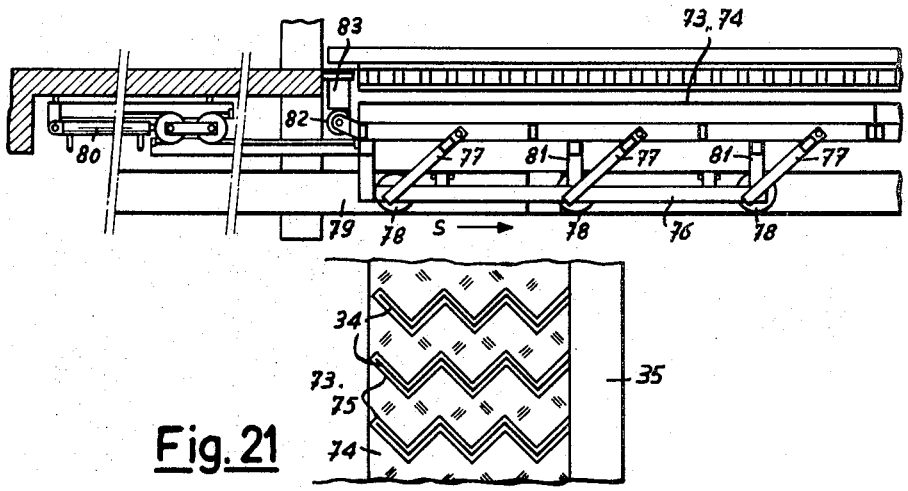
Fig. 21
INVENTOR
ROGER BAJULAZ
By Young & Thompson
ATTYS.

United States Patent Office 3,339,709
Patented Sept. 5, 1967

1

3,339,709
VERTICAL TRANSPORTER
Roger Bajulaz, 13 Chemin Pierre Grise,
Genthod-Geneva, Switzerland
Filed July 13, 1965, Ser. No. 471,692
Claims priority, application Switzerland, July 21, 1964,
9,504/64
10 Claims. (Cl. 198—157)

The present invention relates to a vertical transporter comprising a structure of vertical axis and at least one supporting surface consisting of a support on which bearer elements are mounted and which is driven in its cyclic displacements by means of a driving device, the said supporting surface being situated in its working position on one side of the elevator structure during its productive displacements and in a concealed position on the other side of the said structure during its unproductive displacements, characterised by the fact that it comprises an actuating means which, at the end of the productive or unproductive travel of the supporting surface, causes the bearer elements to move towards the vertical structure so that the said supporting surface can move from its working position to its concealed position or vice versa, so as to reduce the volume of displacement necessary for the platform during its non-productive travel in relation to the displacement volume of the platform during its productive travel.

By way of example, a form of embodiment and some alternative embodiments of the vertical transporter according to the invention are diagrammatically illustrated in the attached drawings, in which:

FIG. 2 is a cross-section taken along the line I—I of FIG. 1;

FIG. 3 is a partial view of a transporter as seen in the direction of the arrow A in FIG. 1;

FIG. 4 is a partial view of a transporter seen in the direction of the arrow B in FIG. 1;

FIG. 5 is a cross-section taken along the line II—II of FIG. 4;

FIG. 6 is a cross-section taken along the line III—III of FIG. 4;

FIG. 8 is a detail, in cross-section, showing the fixing of a bearer element on a transporter platform;

FIG. 9 is a plan view showing part of the transporter platform, the bearer elements being in their concealed position;

FIG. 10 is a plan view showing part of a transporter platform with the bear elements in their working position;

Figures 16, 17:
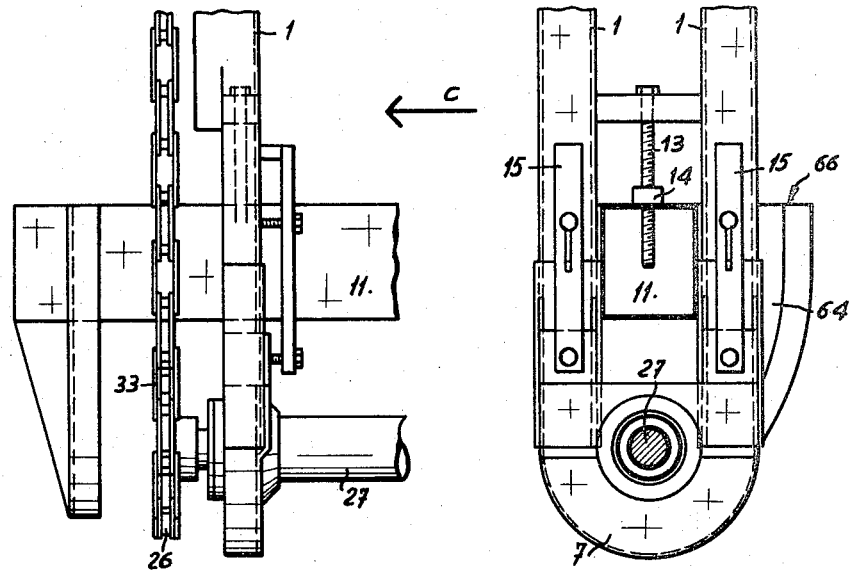
Figure 18:
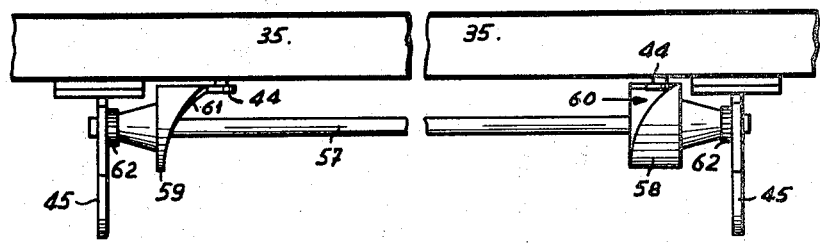

FIG. 11 diagrammatically shows an alternative embodiment of the transporter platform;

FIG. 12 is a cross-section taken along the line IV—IV of FIG. 11;

FIGS. 13, 14 and 15 diagrammatically illustrate a second alternative embodiment of a platform of the transporter, the bearer elements of which are in different positions;

FIG. 16 is a detailed view of a transporter;

FIG. 17 is a view of the detail illustrated in FIG. 16, from the direction C;

FIG. 18 partly shows the transporter actuating means;

FIG. 19 is a cross-section taken along the line V—V of FIG. 2 with certain parts removed;

2

FIG. 20 is a cross-section taken along the line VI—VI of FIG. 19 with a certain parts removed, and FIG. 21 is a partial plan view of the closure plates and supporting surfaces of the transporter.

In the forms of embodiment and alternative arrangements illustrated and described hereinafter, the continuous elevator which is the object of the present invention is used as a vertical transporter in a mechanical garage installation for motor cars. This mechanical garage installation may be of the type described in Swiss Patent No. 370,564.

It is obvious, however, that the elevator according to the present invention could be used in other mechanical garage installations or even simply as a goods hoist. Indeed, the application of the present invention, although principally concerned with the garaging of motor vehicles, may be adapted by any one skilled in the art to any other installation requiring a continuous vertical elevator or transporter.

Figure 1:
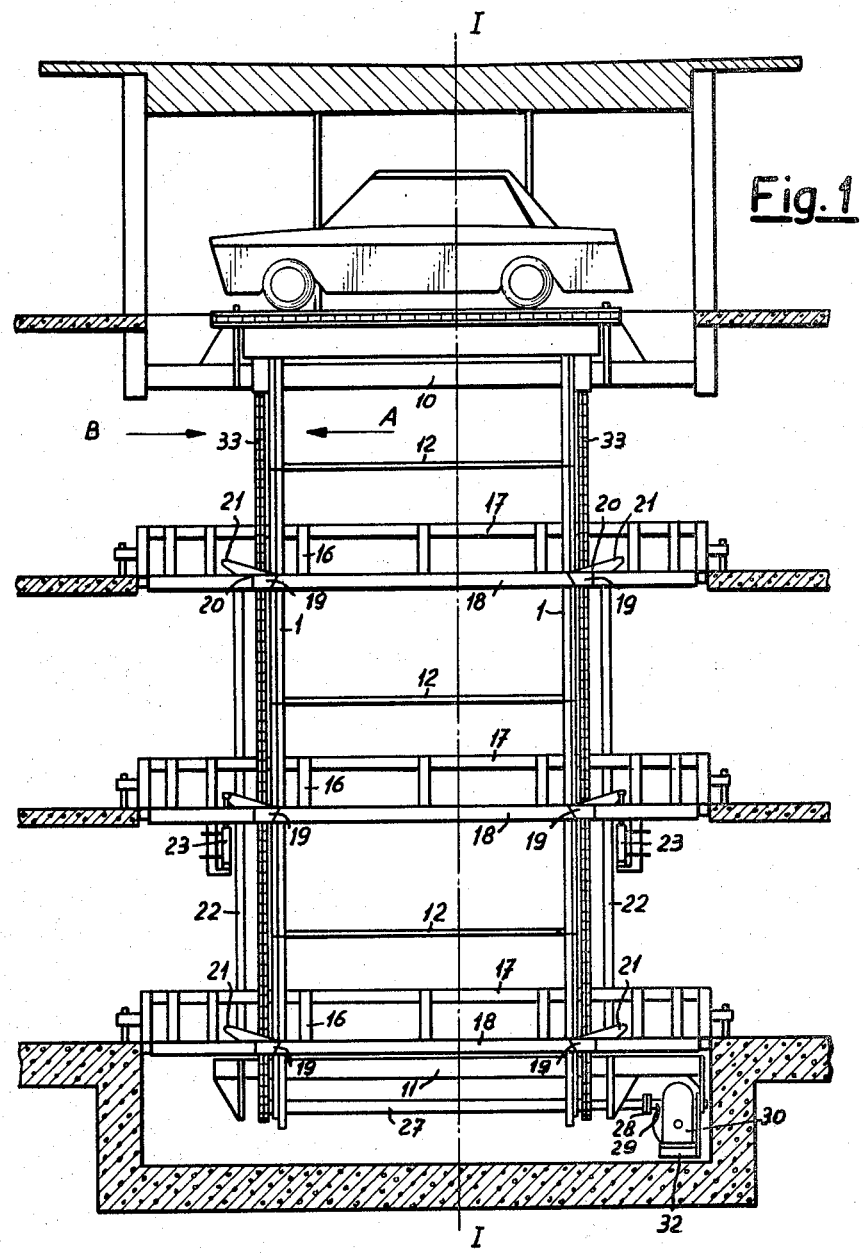
FIG. 1 is a partial view, in elevation, of a mechanical garage installation employing vertical transporters according to the invention.

The elevator illustrated in FIGS. 1 and 2 consists of two identical vertical transporters or assemblies disposed one facing the other and driven in synchronism.

The said two vertical assemblies or transporters being identical, only one of them will be described in detail and the corresponding elements of the said two transporters will bear the same reference numerals.

In the form of embodiment illustrated, the two vertical transporters facing each other are arranged in one trench or pit, with their tops approximately level with the ground. Furthermore, each vertical transporter intersects at right angles a certain number, for example three as illustrated, of horizontal roller tracks. By virtue of this, the form of embodiment of elevator illustrated shows the use of vertical transporters in a mechanical garage installation for motor cars, of the type described in Swiss Patent No. 370,564. It goes without saying that this form of embodiment of the elevator is a particular and non-limitative application of vertical transporters according to the invention.

Each of the two vertical transporters or assemblies illustrated comprises a structure, one or a plurality of supporting surfaces or platforms, a driving apparatus and an actuating means.

The structure of a continuous vertical transporter consists, in the example illustrated, of two guides 1 disposed parallel with each other and spaced by an amount approximately equal to the width of a transporter platform.

Each guide 1, closed on itself, constitutes a closed circuit and comprises two parallel rectilinear portions extending over the entire height of the transporter, being connected to each other by two end portions 6, 7 of semicircular form, one at the upper end and the other at the lower end of the said rectilinear portions. In the example illustrated (FIGS. 4 to 6), the said guides 1 are formed by rolled sections of generally U-shaped cross-section, of which flange 2 is longer than flange 3. The dorsal part 4 of the guides is directed towards the outside of the transporter, that is to say the openings in the two guides in one and the same structure face each other. Furthermore, the long flange 2 is situated towards the rear of the transporter while the short flange 3 points towards the front of the transporter, that is to say towards the cage of the transporter or the space within which the platform of the transporter moves during its productive movements. The two straight parts of a guide are connected to each other by means of cross-members 5 to ensure rigidity in the guide and to avoid any deformation thereof. It must be noted that the said straight parts of the guides may be either in one piece or may be assembled from guide sections fixed end to end.

The top 6 and bottom 7 end portions of the guides are formed by a plate 8 on which is an outer flange 9. Said flange 9 is semi-circular in shape, extends perpendicularly to the surface of the said plate 8 and has a diameter corresponding to the distance separating the flanges 2 and 3 of the guide which are the most remote from one another. In this way, the said flange 9 constitutes an extension of the flange 3 on the front straight part of the guide and of the flange 2 on the rear straight part of the guide. Said end parts thus constitute an extension of the straight parts of the guide, ensuring continuity thereof. The height of the flange 9 of the end pieces 6, 7 is equal to the height of the short flange 3 on the straight parts of the guide.

The said end parts are fixed rigidly on the corresponding ends of the straight parts of the guide. Each guide is integral with a top girder 10 and a bottom girder 11 situated close to the top and bottom ends of the guide and between the two straight parts thereof. The said girders 10, 11 constitute means of anchoring the transporter to the building in which it is erected. Said girders 10, 11 therefore connect between them the two guides 1 which form part of one and the same vertical transporter. The said two guides 1 are furthermore connected to each other by means of cross-members 12 to ensure rigidity of the whole.

Each guide 1 further comprises a length regulating means, that is to say a means for adjusting the height of the vertical transporter. For this purpose, each guide 1 is divided into two parts sliding inside each other, the relative position of which is fixed by means of a screw for example. In the form of embodiment illustrated, one of the said parts of the guide is small in relation to the other, the adjusting means being situated in the immediate proximity of the bottom end piece 7. In this example, the adjusting screw 13 determines the distance separating a cross-member 12 from the lower girder 11. A lock nut 14 is provided in order to establish the relative positions of the two parts of the guide 1 once its length has been adjusted exactly to the desired value. A locking arrangement makes also makes it possible to secure the parts of the guide 1 in their desired respective positions. The said locking device comprises, in the example illustrated, plates 15, each bolted to each of the parts of guide 1.

The structure of a vertical transporter therefore comprises two guides 1 forming closed circuits, disposed parallel in relation to each other and extending over the entire height of the said transporter, being connected to each other by two girders 10, 11, and cross-members 12.

This structure is, in the example illustrated, designed to be fixed rigidly, either to a metal superstructure or directly keyed into the brickwork of a building or a construction in which the said transporter has to be incorporated.

One method of securing this structure which appears to be very advantageous is that illustrated in the drawing. In the said form of embodiment, the top girder 10 extends on either sides of the guides 1 over a sufficient distance to enable its ends to fit flush in a wall or any other integral part of the construction which is to receive the transporter. The structure and, therefore, all the transporter, is thus suspended. The means of guiding the said structure are provided at each level of the construction or building in order to maintain the structure in a correct position. However, the said guide means have not the function of supporting the said structure. Such an arrangement is particularly advantageous because it eliminates all the adjustments generally needed at each level in order to have the integral fixing elements of a metal frame constructed with certain tolerances correspond with the levels of a building constructed with different tolerances. On the other hand, it is obvious that the girder 10 and its housings must be sufficiently rigid and offer adequate resistance to support all the transporter and its maximum loading, taking into account the safety factors normally employed in this kind of installation.

In the form of embodiment illustrated, the said guide means consist of trusses 16 comprising a top longitudinal member 17 extending between the straight parts of the guide 1 and a lower longitudinal member 18 disposed in front of the front straight part of the guide 1. Said trusses 16 therefore make it possible, without being fixed rigidly to the guides 1 of the transporter, to guide these latter. The said trusses rest on each story on either side of the transporter cage. The lower longitudinal member 18 of the said trusses comprises two moving portions 19 which are adapted to pivot about an axis 20 and to pass from the position shown in FIG. 1 into a position in which they expose passages in the lower longitudinal member 18, adapted to allow passage of the organic means connecting the platform to the guides 1 during the productive vertical displacements of the said platform. Each section 19 is integral with a lever 21. All the levers 21 situated one above the other are connected to one another by means of a linkage 22. Furthermore, one of the said levers 21 is mechanically connected to the piston of a hydraulic double-acting jack 23 which, during its displacements, controls the pivoting of sections 19.

The means for driving the vertical transporter comprises two top chain wheels 24 pivoted in the top end parts 6 of the guides concentrically with the flange 9 of the said end parts 6. The said two chain wheels 24 are both mounted on one and the same shaft 25 extending between the two end parts 6 of the vertical transporter structure.

The said driving means also comprises two bottom chain wheels 26 pivoted in similar manner to the chain wheels 24 in the bottom end parts 7 of the guides 1 of the structure. The said bottom chain wheels are connected to each other by a drive shaft 27. The said drive shaft 27 is extended on one side beyond the structure and is linked mechanically through a coupling 28 to the output shaft 29 of a reduction gearing 30 driven by means of an electric motor 31. The said reduction gearing 30 and the electric motor 31 are mounted on a support 32 integral with the structure of the vertical transporter.

Finally, endless chains 33 are stretched between the top chain wheels 24 and the bottom chain wheels 26 pivoted on one and the same guide 1.

The platform of the vertical transporter comprises bearer elements 34 mounted parallel with one another on a joist 35. In the active position of the platform, during its productive displacements, the said bearer elements 34 extend virtually at right angles to the said joist 35. In the form of embodiment illustrated in FIGS. 8, 9 and 10, the bearer elements 34, when seen from above, have the general shape of a zig-zag line. Joist 35 consists of a channel iron and one one of the ends of each bearer element engages in the said joist 35 through the opening in the channel iron. Furthermore, each bearer element 34 is pivoted on a vertical axis 36 connecting the edges of the flanges of joist 35. All the ends of the bearer elements 34 situated within the joist 35 are connected mechanically to one another. The said mechanical connection consists of a rolled section 41 of which the cross-section has the general shape of a U in which are engaged the ends of the bearer elements. The end of each bearer element 34 consists of flat pieces 37 integral with top and bottom portions of each bearer element and of which the free end, comprising bore 39 of vertical axis, extends beyond the rear face 38 of the bearer element. Spindles 40 engaging in bores 39 of each bearer element 34 are fixed rigidly on the flanges of rolled section 41. In this way, the distance separating the ends of each bearer element is fixed. This distance is equal to that separating two vertical spindles 36 on which the bearer elements are pivoted in relation to the joist 35. In this manner, the bearer elements 34 always stay parallel with one another whatever their angular position in relation to the said joist.

Two of the spindles 40 emerge through apertures 42 provided in joist 35 outside the lower face 43 of the said joist 35. The free end of the two spindles 40 is provided with a roller 44. This platform can therefore, by simple pivoting of its bearer elements, move from its active position (FIG. 10) to its concealed or retractive position (FIG. 9).

The supporting surface of this platform, constituted by bearer elements 34 and joist 35, is connected mechanically on the one hand to the driving means and on the other to the structure of the vertical transporter.

Indeed, the joist 35 is integral with lateral parts 45 pivoted on a support 46 about a spindle 47. Said lateral parts 45 comprise a bearer surface 48 adapted to rest on an abutment 49 on the support 46 when the platform is in its active position. Said supports 46, arranged on either side of the joist, are connected to each other by means of girders 50, of which one, the top girder, constitutes the abutment 49. In the example shown (FIG. 5), these supports are formed by two plates connected to each other and between which is disposed the corresponding lateral member 45.

Each support 46 also comprises two journals 51 extending perpendicularly beyond the plane of the inner plate of the support 46. Said journals 51 simultaneously constitute two successive pins or spindles for the corresponding chain 33, thus ensuring attachment of the platform to the driving means. Furthermore, the free end of each of these two journals 51 comprises a guide roller 52. Said guide rollers 52 are disposed inside the slot in guides 1. In the form of embodiment illustrated, the journals 51 are strengthened by means of U-shaped reinforcements 53, 54 to avoid any flexion in the said journals. One of the said reinforcements 54 extends beyond the support 46 and forms a strut on the end of which is a bearing roller 55 which comes in contact with the larger flange 2 of the straight parts of the corresponding guide 1, but not with the small flange 3 of the said guide.

The transporter actuating means causes the platform to pass from its active position into its retracted position. Said actuating means comprises, fixed rigidly underneath the joist 35, two lateral parts 45 acting as a support and as a thrust bearing for a cam shaft 57. Said cam shaft 57 comprises two bell cams 58, 59 the profiles of which are complementary to each other. One of these cams 58, has a notched part 60, of which one edge is parallel with the cam shaft 57 while the other is formed in a gentle slope. The other, 59, of these cams comprises a lift 61, of which one side is parallel with the cam shaft 57 while the other is sloped to correspond with the slope of the notch 60. The edge of the notch 60 and the flank of the lift 61, which are parallel with the cam shaft 57, are disposed in one and the same radial plane of the said shaft 57. Each of the said cams, 58, 59, is disposed in the proximity of one end of the cam shaft 57 and its working profile co-operates with one of the rollers 44. The angular position of the cams 58, 59 therefore unequivocally determines the angular position of the bearer elements 34 in relation to the joist 35.

At each of its ends, cam shaft 57 also carries a toothed pinion 62 meshing with a rack 68 carried by the upper part of the inner plate of the corresponding support 46. In this way, when the lateral members 45 pivot about their axis 47 in relation to supports 46, cam shaft 57 is caused to rotate, which causes the bearer elements 34 to pivot in relation to the joist 35.

This actuating means also comprises a top cam 63 and bottom cam 64, each comprising a guide 65 which takes the form of a slot. Said cams are rigidly mounted on girders 10 and 11 respectively. The slot 65 in the said cams generally has the form of a portion of spiral; however, the two extremities of this guide 65 are parallel with this axis of symmetry through guides 1, that is to say they are vertical. One 66 of these extremities, that situated on the side of the transporter cage, is located at a greater distance than the other from a plane passing through shafts 25 and 27 carrying the chain wheels 24 and 26.

Finally, said actuating means also comprises a roller 67 pivoted on each of the lateral members 45 intended to co-operate with the slot 65 in the corresponding cams 63, 64.

Figure 7:
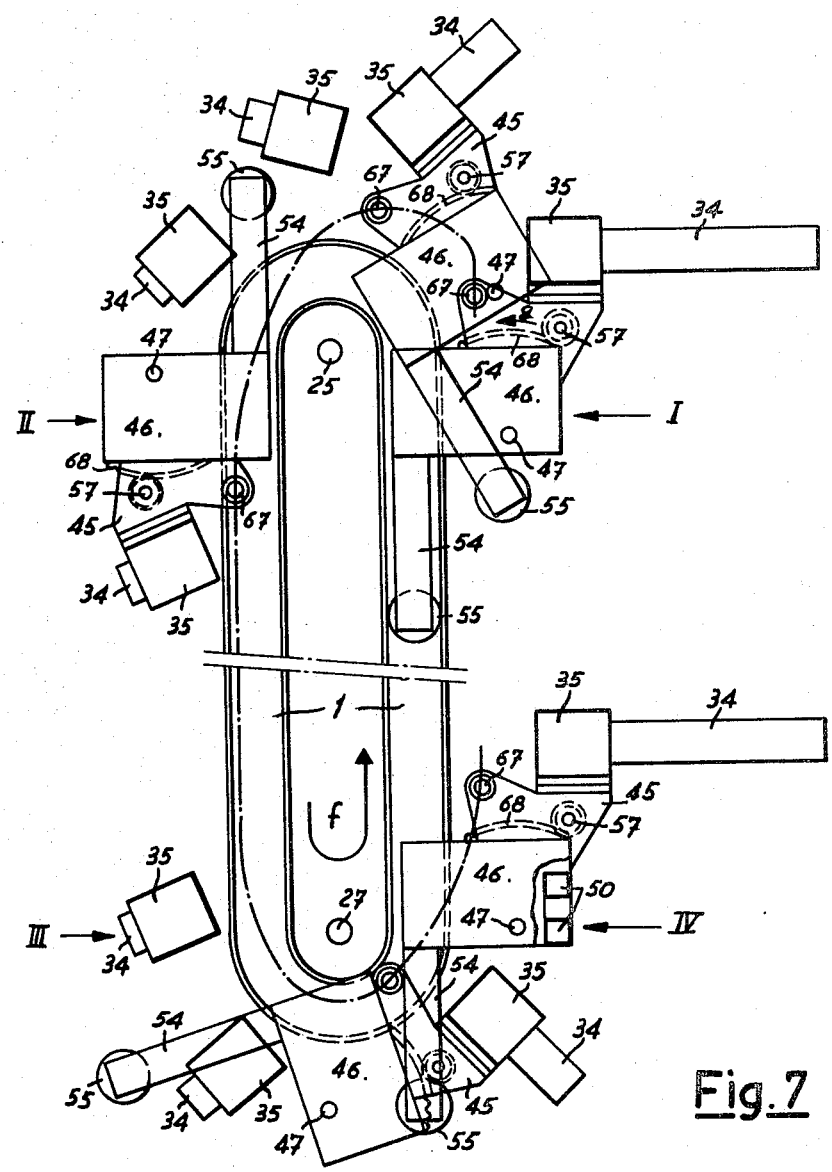
FIG. 7 is a diagrammatic side view of the transporter illustrating the kinematics of the transporter.

The vertical transporter described operates in the following manner:

FIG. 7 shows diagrammatically the kinematics of the vertical transporter. Let it be assumed that the chains 33 are driven by means of the motor 31 in the direction of the arrow f and the platform is driven by these chains 33 in the position I (FIG. 7). Let it likewise be assumed that the portions 19 of the longitudinal members 18 of the trusses 16 are in the raised position, that is to say they allow passage of the platform supports 46. In this position I, the platform is in its active position and is capable of carrying a load. Indeed, the bearer elements 34 extend perpendicularly beyond the joist 35 and thus define a supporting surface. Furthermore, the lateral members 25 rest, by means of their support surface 48, on the abutment 39 of supports 46. Said lateral members 45 are therefore held in this operating position, defined by the abutment 39, so that, in this position I of the platform, the supporting surface of the platform is maintained in a horizontal position. Moreover, rollers 52 are held in the slot in the guides 1 while the roller 55 is maintained in contact with the flange 2 of the guide 1 by the couple due to the inherent weight in the platform. The distance separating the rollers 52 and 55 is sufficient to absorb considerable couples resulting from the weight of a burden placed on the supporting surface.

The platform remains in this position throughout all its vertical displacement corresponding to its productive travel, that is to say while the platform is situated in the transporter cage and is capable of carrying a load.

During the said productive travel of the said platform, the latter is displaced within a vertical volume defined by the product of the platform area in its working position, seen in plan view, by the height of the transporter, that is to say the distance over which the platform carries out its productive course.

When the platform has completed its productive travel, for example has risen fully, it reaches the position I shown in FIG. 7.

From that moment on, when the platform continues to move in the direction of the arrow f, still being driven by chains 33, the roller 67 carried by each of the lateral members 45 of the platform comes to the end 66 of the slot 65 in the corresponding top cam 63. From that moment on and until such time as the platform is in position II (FIG. 7), the cam 63 will make it necessary to reduce the distance separating the chains 33 and rollers 67. Such a reduction in this distance can be achieved only by the lateral parts 45 pivoting in the direction of the arrow g about their axis 47 in relation to the support 46. During the said pivoting of the lateral members 45, the pinions 62 which are in mesh with the teeth 68 of the supports 46 are driven in rotation, which produces an angular displacement of the cam shaft 57. The extent of the angular displacement of the said cam shaft 57, during passage of the lateral parts from their position illustrated as I into their position illustrated at II, is approximately 360°. The said cam shaft 57 drives the bell cams 58, 59 in their angular displacements. During pivoting of the lateral members 45 in the direction of the arrow g, bell cam 58 causes the roller 44 engaged in the notch 60 of the said cam to be displaced in the direction of the arrow h (FIG. 20). Said roller 44, as it moves, entrains the rolled section 41 and therefore all the rear ends 38 of the bearer elements 34 (FIGS. 8, 9, 10), causing the latter to pivot in relation to the joist 35. The said bearer elements 34 therefore pass from their position as illustrated in FIG. 10 into their position as illustrated in FIG. 9.

Passage of the platform from its position I to its position II (FIG. 7) produces retraction or concealment of the supporting surface of the platform by its bearer elements moving towards the vertical structure. This is achieved on the one hand by folding-back of the bearer elements and on the other by tilting of the joist 35 towards the chains 33. In the position II illustrated in FIG. 7, the platform is concealed, the roller 67 leaves the slot 65 in the top cam 63 and the platform remains in this position by the effect of its own weight. This platform remains in this concealed position throughout its unproductive displacement, that is to say over the entire length of the rear guide 1.

During displacement of the platform from position I into position II, the support 46 is guided on the one hand by the chains 33 and on the other by the rollers 52 co-operating with the flange 9 of the top parts of the guide 1. During this displacement, the roller 55 leaves the guide 1, which is possible since the latter does not come in contact with the flange 3 of the said guide 1.

During its unproductive displacement, the platform moves in a concealed position inside a volume defined by the area of the platform in its retracted position, seen in plan, multiplied by the distance represented by the unproductive travel of the platform. The said volume of displacement of the unproductive travel of the platform is far less than the volume of displacement of the productive travel of the platform. Indeed, the area of the retracted or concealed platform, seen in plan view, is far smaller than that of the platform in its working position.

At the end of the unproductive displacement of the platform, the latter is in its position III, still assuming that the chains 33 are displaced in the direction of the arrow f. In this position III, the platform is disposed in the same way as in position II, but the rollers 67 of the lateral members 45 are engaged in the slot 65 of the bottom cams 64. Said bottom cams 64 being identical but reversed in relation to the top cams 63, they tend to move the rollers 67 away from the chains 33, out of the movement of the platform from its position III to its position IV (FIG. 7). Lateral members 45 are pivoted in relation to supports 46 in the direction opposite to that of arrow g, which, in the manner described earlier, produces angular displacement of the cam shaft 57 in the opposite direction until it reaches its initial position. During this displacement, the roller 44, co-operating with the cam 59, is displaced towards the right (FIG. 20), which in the manner described earlier, causes the bearer elements 34 to pivot in relation to the joist 35. Said bearer elements 34 are thus restored to their active position. In the position IV, the platform is again in its active working position inside the cage of the transporter for its productive travel, which lies between this position IV and the position I.

The operation has been described when the chains 33 are moving in the direction of the arrow f; it is obvious that this operation is in every respect similar when the chains 33 are moved in the direction opposite to that of the arrow f. The productive travel of the platform is still comprised between the positions I and IV (FIG. 7) and the unproductive travel of the platform is comprised between positions II and III. Between positions I and IV, the platform is in its active working position whilst it is in its concealed position between positions II and III.

It is obvious that numerous alternatives are possible without thereby departing from the scope of the present invention. In particular, it is possible to construct an elevator (FIGS. 1, 2) consisting of two vertical transporters arranged facing each other. In this case, the two vertical transporters are driven in synchronism by a single electric motor.

The transporters may similarly be individually driven, each by a different motor, if a synchronising device is provided between the two transporters.

A vertical transporter may comprise more than one platform. Indeed, two platforms could be provided, driven by the same chains and fixed to these chains for example in such a way that when one of the platforms is in position I (FIG. 7), the other is in position III. Similarly, it would be possible to provide a plurality of platforms uniformly distributed along chains 33.

The form of the bearer elements 34 could likewise vary. FIGS. 13 to 15 show, in various positions, the bearer elements 34 having an acutely angled zig-zag form in relation to the joist 35.

In the alternative embodiment illustrated in FIGS. 11 and 12, the bearer elements 34 consists of channel irons of variable cross-section. Indeed, the said channel irons exhibit a larger cross-section at their base, connected to the joist 35, than at their free end. In this way, the bearer elements fit into one another in a retracted position. In effect, when in the retracted position, they are offset in relation to one another, which makes it possible for them to fit into one another.

In an alternative embodiment (not shown), the bearer elements 34 could be pivoted on the shaft 35, not on vertical spindles but on horizontal spindles. In such an alternative embodiment, the bearer elements would be displaceable in a vertical plane in order to pass from their working position to their concealed position. The actuating means would be modified accordingly.

FIGS. 19 and 20 show a partial view of a closing means which makes it possible to close the cage of the elevator when this is at a standstill and when one of the platforms is in the position I (FIG. 7). Indeed, the said position I (FIG. 7) of the platform is the one in which the platform is receiving a load which has to be transported. In this position I, in fact, the platform is situated approximately at ground level. In certain embodiments, it is important to provide closing means to close the cage of the elevator when one of its platforms is stopped in position I for the operation in connection with loading the platform to be carried out with no risk to the operator or user.

The said closing means comprises, on the one hand, gangways adapted to cover the structure of the vertical transporter(s) forming the elevator and, on the other, plates to seal off the cage of the elevator, that is to say the space within which the platform(s) of the vertical transporter(s) move(s).

The closing means illustrated and described below is provided in order to close the cage of an elevator consisting of two vertical transporters situated face to face, as illustrated in FIGS. 1 and 2 for example.

In the working position, when one of the platforms of each of the vertical transporters is stopped in the top position I (FIG. 7), the plates close the space comprised on the one hand between the bearer elements of the supporting surfaces of the said platforms and on the other the space comprised between the said two supporting surfaces which are opposite each other. Still in this working position, the gangways each occlude one of the spaces comprised between the edge of the trench on the inside of which the elevator is situated and the joist of the supporting surface of the corresponding vertical transporter.

In the form of embodiment of the gangway closing device as illustrated, two in number, each of two elements 68, 69 are formed to be articulated in relation to each other on an axis 70. The element 68 is furthermore pivoted at its free end on a frame 71 sealed into the building while the free end of the element 69 is adapted to rest on the joist 35 of the platform of a vertical transporter when the latter is stopped in position I (FIG. 7). The said gangway therefore covers the entire structure of the vertical transporter. A hydraulic jack 72 connects portions 68 of the gangway to girder 10 of the vertical transporter structure and makes it possible to move the gangway from its working position A (FIG. 20) into its raised position B (FIG. 20) so that it is out of the way of the transporter platforms.

The closing plates are also two in number in the example illustrated and each comprises a solid middle area 73 and a lateral area 74 exhibiting recesses 75 corresponding in shape to the bearer elements 34 of the platform of a transporter. Said middle area 73 and said lateral surface 74 are both made of striped plate reinforced by mearer ribs or substructures. The said two surfaces 73 and 74 are integral with one another in the example shown and form a floor adapted to occlude half the space within which the platforms of two facing transporters move. It must also be remarked that, by reason of the short length of the bearer elements 34, the recessed parts 75 of the side surface 74 represent only a small portion of the area. The said two surfaces 73 and 74 are mounted on a trolley by means of arches 77. In the example illustrated, the trolley comprises three pairs of rollers 78 pivoted on a frame formed by rolled iron sections 76. Rollers 78 are engaged in lateral guides 79 extending parallel with the joist 35 of the platform of a transporter and fixed on the structure thereof. The arches 77 are pivoted on the one hand on the trolley and on the other on the surfaces 73, 74 so that the latter are capable of being displaced vertically parallel with themselves in relation to the trolley. The said trolley also comprises abutments 81 adapted to receive surfaces 73, 74 when these latter are in the rest position.

The said closing device also comprises a means for actuating the trolley in its movements between an active position, when it is situated in the cage of the transporter, and an inactive position when it is situated laterally outside the said cage. In the example shown, the actuating means comprises a double-action hydraulic jack 80 connected to the trolley by a chain.

The lateral surface 74 also comprises, at one of its ends, a roller 82 designed to co-operate with a guide 83 formed by a channel iron disposed vertically and integral with the building or the structure of the transporter, and of which one of the flanges is extended to form an abutment 84.

The said closure plates operate in the following way:

In the rest position, surfaces 73, 74 are in the down position and rest on the abutments 81 on the trolley. The trolley is in the retracted position situated outside the cage of the transporter.

Movement of the closure plate into its working position is caused by the actuating means which moves the trolley in the direction of the arrow s. When the trolley has reached the position illustrated in FIG. 19, surfaces 73 and 74 are aligned vertically over their working positions. Roller 82 comes in contact with the abutment 84 and therefore maintains the surfaces in this position. The actuating means continues to move the trolley in the direction of the arrow s, which results, through the arches 77, in the trolley being displaced vertically in the direction of the transporter platform. When the trolley arrives at the end of its feed stroke, surfaces 73 and 74 are situated slightly above a plane containing the top surface of the bearer elements of the platform.

The closure plate is withdrawn in a similar fashion by the return movement of the trolley.

It must be noted that all the elements of the transporter according to the invention are situated below the culminating point of the trajectory of the joist 35 of the platform during its semirotation at the top end of the structure. In this way, the top elements of the transporters are for practical purposes disposed on the same level as the supporting surface of the platform when the latter is at the top end of its productive travel.

One very important fact must also be noted: the platform is concealed by a reduction in the volume occupied by the said platform. This reduction in the volume occupied by the platform is achieved by mechanical displacement, by means of the actuating device, some elements of the said platform in relation to others.

What I claim is:

1. A vertical transporter comprising a flexible driving member, means for moving the flexible driving member in an endless path, a plurality of supporting members carried by the driving member and having upper support surfaces disposed at a substantially common level, and means mounting the supporting members on the driving member for extending and retracting movement relative to the driving member about vertical axes spaced a substantial distance from the driving member.

2. A transporter as claimed in claim 1, said level being above said mounting means.

3. A vertical transporter comprising a flexible driving member, means for moving the flexible driving member in an endless path, a plurality of supporting members carried by the driving member, and means mounting said supporting members on the driving member for horizontal swinging movement about vertical axes between a first position in which the volume within the periphery of the supporting members is relatively large and a second position in which said supporting members nest with each other and the volume within the periphery of the supporting members is relatively small.

4. A transporter as claimed in claim 3, said axes being spaced a substantial distance from said driving member.

5. A vertical transporter comprising a flexible driving member, means for moving the flexible driving member in an endless path, at least one supporting means carried by the driving member, and means mounting the supporting means on the driving member for horizontal swinging movement about at least one vertical axis between a first position in which the volume within the periphery of the supporting means is relatively large and a second position in which the volume within the periphery of the supporting means is relatively small.

6. A vertical transporter comprising a flexible driving member, means for moving the flexible driving member in an endless path having two vertical runs, at least one bracket carried by the driving member and extending outwardly of said endless path, a continuous guideway for said bracket about said path, at least one supporting member, means mounting the supporting member for movement about a vertical axis between a first position in which the volume within the periphery of the supporting member is relatively large and a second position in which the volume within the periphery of the supporting member is relatively small, and means maintaining the supporting member in said first position during travel along one said run and in said second position during travel along the other said run.

7. A transporter as claimed in claim 6, there being a plurality of said supporting members having upper support surfaces disposed at a substantially common level.

8. A transporter as claimed in claim 7, there being a plurality of said supporting members that nest with each other in said second position.

9. A transporter is claimed in claim 6, said vertical axis being spaced a substantial distance from said driving member.

10. A vertical transporter comprising a flexible driving member, means for moving the flexible driving member in an endless path having two vertical runs, at least one bracket carried by the driving member and extending outwardly of said endless path, a continuous guideway for said bracket about said path, at least one supporting member, means mounting the supporting member on the bracket for movement about a vertical axis between a first position in which the volume within the periphery of the supporting member is relatively large and a second position in which the volume within the periphery of the supporting member is relatively small, means maintaining the supporting member in said first position during travel along one said run and in said second position during travel along the other said run, and means for moving the supporting member back and forth between said first and second positions, said last named means comprising cams disposed adjacent the upper and lower ends of said runs and having spiral cam surfaces thereon.

References Cited

UNITED STATES PATENTS

| | | | |
|---|---|---|---|
| 1,699,187 | 1/1929 | Graff | 198—171 X |
| 1,794,331 | 2/1931 | Klyver et al. | 198—156 X |
| 2,728,467 | 12/1955 | Glicker | 214—16.12 |
| 2,956,668 | 10/1960 | Fioravanti | 198—153 |
| 3,045,807 | 7/1962 | Fioravanti | 198—153 |

FOREIGN PATENTS

| | | |
|---|---|---|
| 627,608 | 3/1936 | Germany. |
| 954,393 | 4/1964 | Great Britain. |

EVON C. BLUNK, *Primary Examiner.*

R. J. HICKEY, *Assistant Examiner.*